(12) United States Patent
Warner

(10) Patent No.: US 6,758,009 B1
(45) Date of Patent: Jul. 6, 2004

(54) LIGHTED INSECT TRAP

(75) Inventor: William B. Warner, Chandler, AZ (US)

(73) Assignee: Farnam Companies, Inc., Phoenix, AZ (US)

( * ) Notice: Subject to any disclaimer, the term of this patent is extended or adjusted under 35 U.S.C. 154(b) by 0 days.

(21) Appl. No.: 10/421,094

(22) Filed: Apr. 22, 2003

(51) Int. Cl.[7] .......................... A01M 1/04; A01M 1/14
(52) U.S. Cl. ........................................ 43/113; 43/114
(58) Field of Search .................................. 43/113, 114

(56) References Cited

U.S. PATENT DOCUMENTS

| | | | | | |
|---|---|---|---|---|---|
| 449,138 A | * | 3/1891 | Roth | .............................. | 43/113 |
| 550,345 A | * | 11/1895 | Humphreys et al. | .......... | 43/113 |
| 1,037,688 A | * | 9/1912 | Troth | ........................... | 43/113 |
| 1,182,389 A | * | 5/1916 | Levine | ......................... | 43/113 |
| 1,258,504 A | * | 3/1918 | Van Orden | .................... | 43/113 |
| 1,263,562 A | * | 4/1918 | Keiper | ......................... | 43/113 |
| 1,268,127 A | * | 6/1918 | Keiper | ......................... | 43/113 |
| 1,645,715 A | * | 10/1927 | Northrup | ..................... | 43/115 |
| 1,770,737 A | * | 7/1930 | Gwathmey | .................... | 43/113 |
| 2,198,807 A | * | 4/1940 | Eshbaugh | ..................... | 43/113 |
| 2,305,898 A | * | 12/1942 | Richter et al. | ................ | 43/113 |
| 2,791,864 A | * | 5/1957 | Chappell | ..................... | 43/113 |
| 2,873,551 A | * | 2/1959 | Misko | ......................... | 43/114 |
| 3,321,862 A | * | 5/1967 | Peek | ............................ | 43/113 |
| 3,465,468 A | * | 9/1969 | Takamoto | .................... | 43/113 |
| 3,729,858 A | * | 5/1973 | Bradshaw | ..................... | 43/114 |
| 3,968,590 A | * | 7/1976 | Kitterman | .................... | 43/114 |
| 4,117,624 A | * | 10/1978 | Phillips | ........................ | 43/113 |
| 4,168,591 A | * | 9/1979 | Shaw | .......................... | 43/114 |
| 5,044,112 A | * | 9/1991 | Williams | ..................... | 43/113 |
| 5,048,224 A | * | 9/1991 | Frisch | ......................... | 43/114 |
| 5,203,816 A | * | 4/1993 | Townsend | .................... | 43/113 |
| 5,231,790 A | * | 8/1993 | Dryden et al. | ................ | 43/113 |
| 5,327,675 A | * | 7/1994 | Butler et al. | ................. | 43/113 |
| 5,608,987 A | * | 3/1997 | Meyer | ......................... | 43/113 |
| 5,950,355 A | * | 9/1999 | Gilbert | ........................ | 43/113 |
| 5,974,727 A | * | 11/1999 | Gilbert | ........................ | 43/113 |
| 6,108,966 A | * | 8/2000 | Otomo et al. | ................. | 43/113 |
| 6,481,152 B1 | * | 11/2002 | Gray | ........................... | 43/113 |
| 6,594,946 B2 | * | 7/2003 | Nolen et al. | .................. | 43/114 |
| 2002/0078620 A1 | * | 6/2002 | Nelson et al. | ................ | 43/113 |

FOREIGN PATENT DOCUMENTS

| | | | | | |
|---|---|---|---|---|---|
| DE | | 244758 B1 | * | 3/1912 | .................. 43/113 |
| DE | | 685259 B1 | * | 11/1939 | .................. 43/114 |
| DE | | 169968 B1 | * | 6/1951 | .................. 43/113 |
| DE | | 3511215 B1 | * | 10/1986 | |
| DE | | 3840440 B1 | * | 10/1989 | |
| EP | | 1203530 B1 | * | 5/2002 | |
| FR | | 422209 B1 | * | 3/1911 | .................. 43/113 |
| FR | | 2797150 B1 | * | 2/2001 | |
| GB | | 20798 B1 | * | of 1908 | .................. 43/113 |
| GB | | 2144020 B1 | * | 2/1985 | |
| GB | | 2381181 B1 | * | 4/2003 | |
| JP | | 8-33444 B1 | * | 2/1996 | |
| JP | | 8-47361 B1 | * | 2/1996 | |
| JP | | 9-23800 B1 | * | 1/1997 | |
| JP | | 2001-269105 B1 | * | 10/2001 | |
| JP | | 2002-125565 B1 | * | 5/2002 | |
| JP | | 2002-306044 B1 | * | 10/2002 | |
| JP | | 2003-199471 B1 | * | 7/2003 | |
| WO | | WO-01/22813 A2 | * | 4/2001 | |

* cited by examiner

Primary Examiner—Darren W. Ark
(74) Attorney, Agent, or Firm—Joseph H. Roediger; Gregory J. Nelson

(57) ABSTRACT

An insect trap employing a light transmissive sleeve for placement over a suspended light source wherein the sleeve is removably secured to the light. The sleeve includes vanes circumferentially spaced on a cylinder with arcuate segments of the cylinder exposed therebetween. An adhesive coating is applied to the vanes and the arcuate segments. Attracted by the light, the insects are drawn to the adhesively coated surfaces and trapped. The sleeve is replaced periodically as necessary.

12 Claims, 2 Drawing Sheets

LIGHTED INSECT TRAP

BACKGROUND OF THE INVENTION

This invention relates to a lighted insect trap of the type utilizing an adhesive coated surface to trap flying insects drawn to the trap by the light.

The attractive nature of ultraviolet light to most flying insects has generated a series of commercial products employing an electrically-charged grid to kill insects drawn toward the light. Contact with the grid causes the electrocution of the insects accompanied by the generation of a spark and a loud sound. These types of traps have fallen into disfavor following the publication of studies indicating that the electrocution of insects can result in the generation of an aerosol of allergens and bacteria, an unwanted and potentially unhealthy byproduct especially at indoor locations. When placed in outdoor locations, the sparks resulting from the electrocution process are a potential fire hazard. This potential hazard is of concern when the trap is placed in or around barns and livestock containment facilities which are typically made of, contain, or are adjacent to combustible materials.

The aforementioned aspects of traps employing electrically-charged grids has created increasing interest in the use of traps relying on adhesively coated surfaces to entrap flying insects drawn toward the coated surface by an attractant or a light surface. The insect trap utilizing an adhesively coated surface has taken many forms. A disposable, collapsible trap formed of a single piece of flexible material is disclosed in U.S. Pat. No. 3,729,858. The structure shown therein has three surfaces extending outwardly from the central axis and is intended to be suspended from outdoors from a tree limb. The absence of a chemical insecticide is a major advantage of this type of device. The radially extending projections or vanes increase the surface trapping area beyond the use of a vertically suspended coated cylinder as exemplified by the structure shown in U.S. Pat. No. 5,048,224.

To enhance the trapping ability of the type of trap relying on an adhesive coating, the use of an ultraviolet light source with the adhesively coated member has been utilized in a variety of devices. For example, U.S. Pat. Nos. 5,950,355, 5,974,727 and 6,108,966 disclose different types of light fixtures which receive a coated "glue board" therein for trapping flying insects. The enclosures permit access to allow the "glue board" to be periodically replaced. The constructional features of decoratively housed traps have limited the surface area available for trapping as well as reduced the efficiency of the ultraviolet light source since the obscuring of the "glue board" from general view is an important feature of this type of trap. The cost of these traps can be significant since they are primarily intended for use indoors.

The present invention is directed to the provision of a relatively low cost insect trap which provides a multiplicity of large area adhesively coated trapping surfaces in proximity to a source of ultraviolet light. In the present invention, the trapping surfaces are oriented to promote availability of all coated surfaces to flying insects. The structure is combined with a conventional hanging fluorescent light of the type commonly referred to as a "shop light" thereby reducing the cost of the combination and allowing for easy replacement of filled trapping surfaces.

A major objective of the present invention is the distribution of light throughout the trapping surfaces to enhance the attractiveness of the device to flying insects. The orientation of large area surfaces spaced about a light transmissive surround for a flourescent light source enables the entire exposed area of the structure to assist in attracting flying insects. As a result, the present invention remains effective until substantially all surface areas have been covered with trapped insects thereby reducing the frequency of replacement of the trapping surfaces.

SUMMARY OF THE INVENTION

The present invention is directed to a lighted insect trap of the type having adhesive coated surfaces for trapping insects thereon. The trap utilizes an elongated light source, typically a flourescent tube, to receive and support a sleeve placed thereon. The sleeve is comprised of a cylinder having a number of outwardly extending vanes spaced about the circumference thereof.

An adhesive coating is applied to the multi-vaned sleeve. The coating appears on the vanes, preferably both on the distal edges and on the large surface areas, and also on the arcuate segments of the cylinder located between the adjacently spaced vanes. The sleeve is formed of a light transmissive plastic. As a result, the placement of the sleeve over the elongated light source results in the light being distributed throughout the sleeve. The vanes and the cylinder thereby serve as sources of light which increases the amount of coated surface area available for trapping and the attractiveness of the coated surfaces to flying insects.

The novel trap further includes a protective shield positioned adjacent to an end cap of the elongated light source. The trap is primarily intended for use in the outside environment and the shield protects the adhesive coated surfaces from precipitation, sunlight and other environmental conditions which might adversely affect the effectiveness of the adhesive coating. In use, the sleeve is supported on the elongated source light beneath the shield by the placement of a support element such as an o-ring on the lower end. A like retaining element can be placed on the opposing end with the protective shield urged thereagainst by the sleeve to impart stability to the parts when aligned on the light source.

The sleeve transmits light from the centrally located source thereby attracting flying insects to the exterior surfaces. When the sleeve is sufficiently covered with trapped insects, the support element is removed from the lower end cap of the light source and the sleeve is removed and replaced. The protective shield is reused with the replacement sleeve.

The vanes and cylinder forming the sleeve can be molded as an integral unit. By using light transmissive plastic, the entire sleeve exhibits attractiveness to flying insects. Thus, the present invention is relatively easy to restore to the original condition and the replacement sleeve is low in manufactured cost. The changing of the sleeve can take place without removing the light source from the operating position.

Further features and advantages of the invention will become more readily apparent from the following description of a preferred embodiment as shown in the accompanying drawings.

DESCRIPTION OF THE PREFERRED EMBODIMENT

Figure 1:
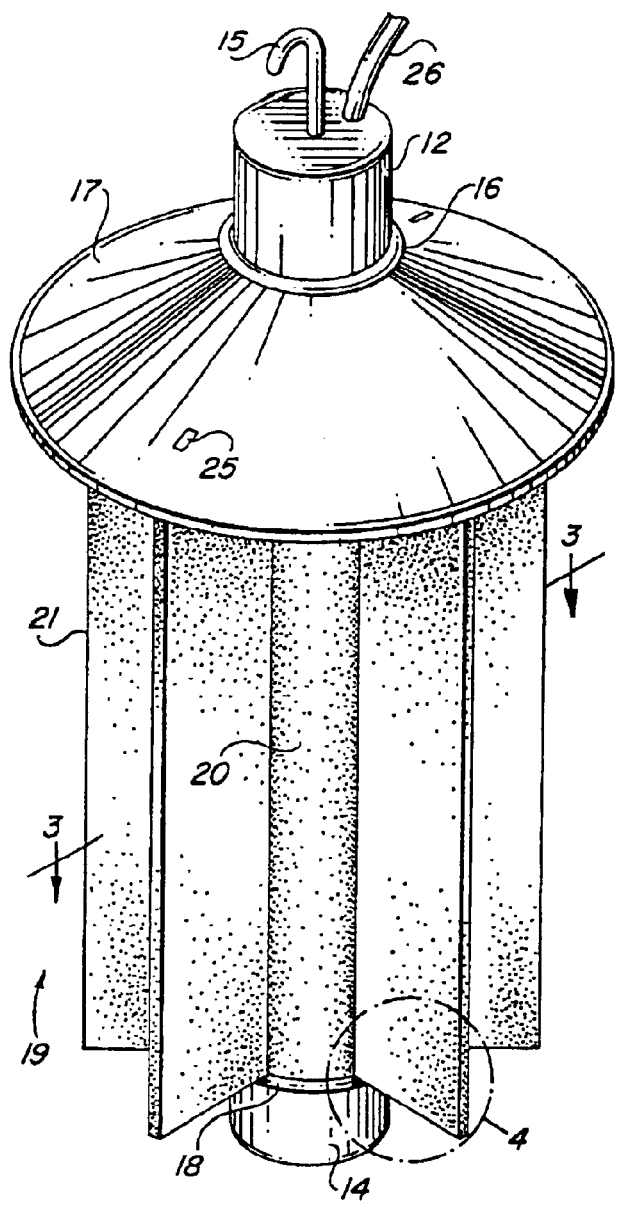
FIG. 1 is a view in perspective of a preferred embodiment of the invention.
Figure 2:
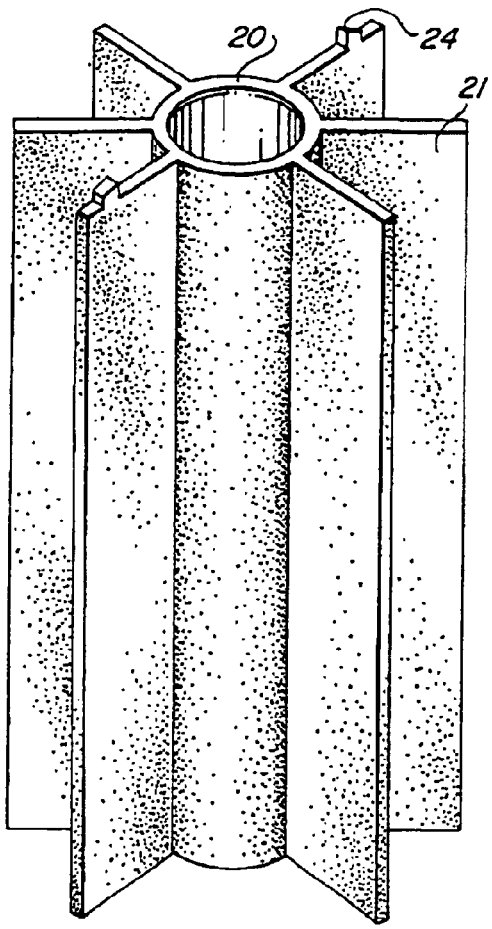
FIG. 2 is a view in perspective of the sleeve in the embodiment of FIG. 1.

Referring now to FIG. 1, a lighted insect trap in accordance with the present invention is shown comprising an elongated light source 11 enclosed by a multi vaned sleeve 19 shown in FIG. 2 and having first and second opposing end caps 12 and 14 respectively. A hook 15 is provided in end cap 12 to support the insect trap in the position shown in FIG. 1. Also, an electrical connection to an electrical source is provided by connector 26. Typically, the elongated light source 11 is a commercially available flourescent "shoplight" wherein the end caps are larger in diameter than the flourescent tube therebetween. However, incandescent light sources and other shapes of fluorescent tubes may be used if desired.

Figure 5:
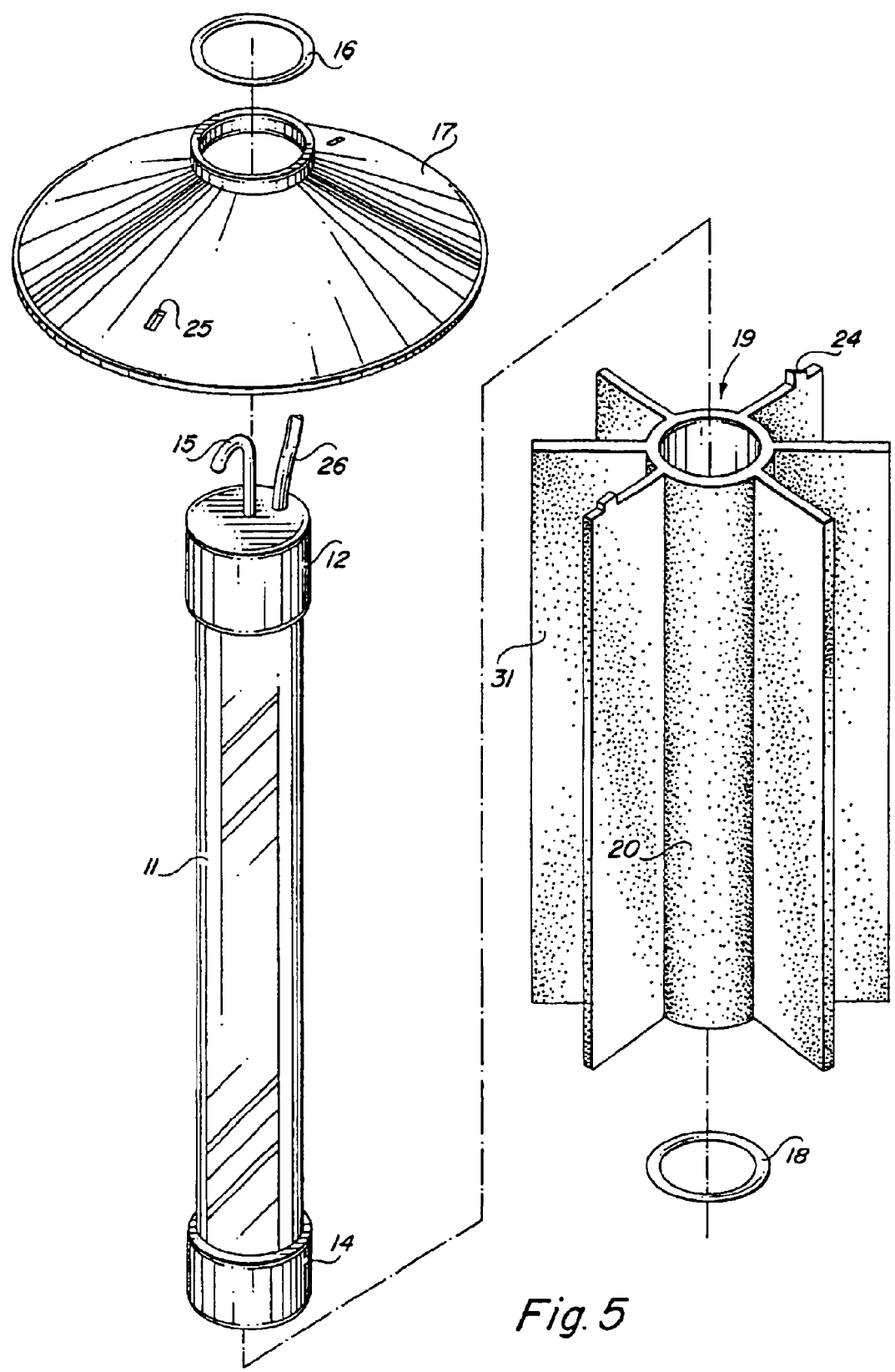
FIG. 5 is an exploded view in perspective of the embodiment of FIG. 1.

The multivaned light transnmissive sleeve 19 of FIG. 2 is shown surrounding the flourescent tube 11 in FIG. 5. The sleeve 19 includes a central cylinder 20 having a number of radially extending vanes 21 affixed thereto. The proximal ends of the vanes are spaced about the circumference of the cylinder 20 thereby establishing peripheral segments of the cylinder between adjacent vanes. In the preferred embodiment, the vanes are spaced about the cylinder periphery to render the large area vane surfaces more available to insects. The perspective view in FIG. 2 shows the orientation of six equal spaced vanes 21 formed about cylinder 20. A pair of opposing vanes are provided with engaging tabs 24 extending upwardly.

Figure 4:
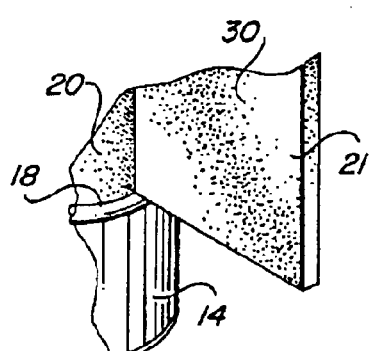
FIG. 4 is an expanded partial view of a designated portion of the sleeve of FIG. 1.
Figure 3:
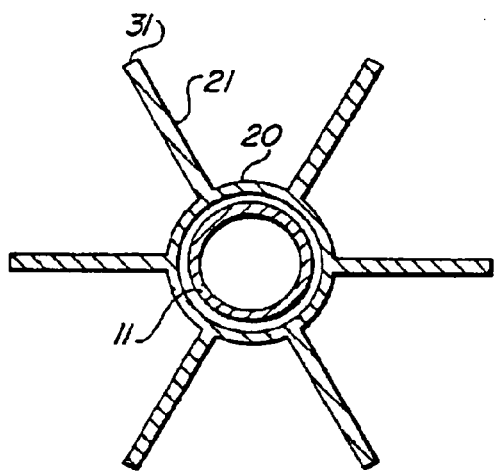
FIG. 3 is a cross-section taken along line 3—3 of FIG. 1.

The protective shield 17 rests on the upper corners of the vanes and is oriented such that the engaging tabs 24 are received in mating receiving slots 25 formed in protective shield 17. A locking element 16 which is shown as an o-ring is positioned on the first end cap 12 to limit movement of the protective shield during use and during the replacement of the sleeve after extended use. A support ring 18 is located on the opposing end cap 14 and is the removable element used to permit replacement of the sleeve at the appropriate time. The region between the inner ends of a vane 21 and the support ring 18 is shown in the expanded view of FIG. 4. In addition, FIG. 4 shows the adhesive coating 30 applied to the external surfaces of the light transmissive sleeve 21 by means of the stippling. In the preferred embodiment, the coating is applied to the edge or end surfaces, large area surfaces and adjacent surfaces of the sleeve. These surfaces are designated as 31, 21 and 20 in the cross sectional view of FIG. 3 which shows the sleeve in place on the light source 11. It is to be noted, that the number of vanes and the spacing thereof about the circumference of the cylinder result in substantial arcuate segments of cylinder 20 between adjacent vanes.

As mentioned, the elongated light source may be a commercially available "shoplight" design wherein a flourescent tube 11 with end caps 12 and 14 is suspended from an overhanging support limb or beam during use. The sleeve 19 which includes the cylinder 20 and the vanes 21 is preferably formed as an integral unit from a molded light transmissive plastic. As a result, the light emitted by the flourescent tube is transmitted throughout the sleeve and serves to attract flying insects to the large area surfaces 21 and the distal ends 31 of the vanes as well as the arcuate segments of the cylinder adjacent thereto. Each of these surfaces is coated with an adhesive in the preferred embodiment to increase the trapping surface area of the embodiment. The adhesive is a pressure sensitive adhesive to retain insects impacting the adhesive and is nondrying. One adhesive successfully used in the present invention is a nondrying polybutene-based adhesive. The light-transmissive plastic used in the fabrication of the sleeve can be either a clear transparent or translucent plastic or may be colored since studies have shown a specific coloration tends to enhance attractiveness of some flying insects to a surface. The protective shield 17 is a molded piece having a central opening dimensioned to be received on an end cap of the flourescent tube. The o-rings 16 and 18 are formed of commercially available elastic material.

The assembly of the preferred embodiment is shown the exploded view of FIG. 5 wherein the elongated light source with end caps 12 and 14 is inserted into the cylinder 20 of sleeve 19 and maintained in position by o-ring 18 being affixed to end cap 14. The protective shield 17 is placed over the hook 15 and electrical connector so that it rests on the top edges of the vanes 21. The shield is rotated to align the tabs 24 with the mating slots 25 and the o-ring 16 then placed on the end cap 12. The assembly is straightforward permitting the trap to be sold unassembled. Further, the replacement of the sleeve 19 when the exposed surface areas of the sleeve are filled with trapped flying insects is well within the skill of the user. Replacement is effected by removing the o-ring 18 and sliding the sleeve off the light source with a fresh sleeve placed thereon.

While the foregoing description has referred to a specific embodiment of the invention, it is recognized that modifications and variations may be made therein without departing from the scope of the invention as claimed.

What is claimed is:

1. An insect trap for placement on a light fixture of the type having a bulb secured in an end cap, the insect trap comprising:
   a. a sleeve formed of light transmissive material and having an exterior surface, the sleeve being dimensioned to fit over said light fixture;
   b. a plurality of vanes formed of light transmissive material and having proximal and distal ends, the proximal ends being affixed to the exterior surface of the sleeve, said vanes are spaced on the exterior surface of the sleeve to provide segments of said exterior surface therebetween;
   c. an adhesive coating applied to the vanes and the segments therebetween, and
   d. a removable support for attachment to said fixture, said support positioning the trap on the fixture.

2. The insect trap of claim 1 further comprising a protective shield for placement on the end cap, said protective shield being supported by the vanes.

3. The insect trap of claim 2 further comprising an engaging tab formed on one of said vanes and a receiving slot formed in the protective shield.

4. The insect trap of claim 3 wherein the sleeve and the vanes are integrally formed of plastic.

5. A lighted insect trap of the type having adhesive coated surfaces for trapping insects thereon, said trap comprising:
   a. a light source having a first end cup;
   b. a multivaned light transmissive sleeve surrounding said light source, said sleeve having a plurality of vanes extending outwardly therefrom, said vanes having proximal and distal ends, said proximal ends being affixed to the sleeve at spaced locations to provide segments of the sleeve therebetween, and c. an adhesive coating applied to surfaces of the vanes and to the segments therebetween.

6. The insect trap of claim 5 further comprising a protective shield positioned adjacent to the first end cap of the light source, said shield extending outwardly of the sleeve.

7. The insect trap of claim 6 further comprising a support element secured to the light source for locating the sleeve thereon.

8. The insect trap of claim 7 wherein at least one of said vanes is provided with an engaging tab and said protective shield includes a receiving slot for engagement therewith.

9. The insect trap of claim 8 further comprising a locking element secured to the light source for positioning the protective shield thereon.

10. The insect trap of claim 9 wherein at least one of said locking element and said support element is removable from the light source.

11. The insect trap of claim 10 wherein the multivaned sleeve has an adhesive coating applied to the distal ends of the vanes.

12. The insect trap of claim 11 further comprising a support hook attached to the light source.

* * * * *